(12) United States Patent
Wada

(10) Patent No.: US 6,648,764 B2
(45) Date of Patent: Nov. 18, 2003

(54) LEAF SPRING TYPE COUPLING AND MOTOR DEVICE USING THE COUPLING

(75) Inventor: Tatsurou Wada, Kitakyushu (JP)

(73) Assignee: Kabushiki Kaisha Yaskawa Denki, Kitakyushu (JP)

(*) Notice: Subject to any disclaimer, the term of this patent is extended or adjusted under 35 U.S.C. 154(b) by 0 days.

(21) Appl. No.: 09/987,582

(22) Filed: Nov. 15, 2001

(65) Prior Publication Data

US 2003/0092494 A1 May 15, 2003

(51) Int. Cl.[7] .................................................. F16D 3/78
(52) U.S. Cl. .......................................... 464/99; 235/103
(58) Field of Search ............................... 464/23, 93–95, 464/98–100; 235/103–104

(56) References Cited

U.S. PATENT DOCUMENTS

| 1,326,993 A | * | 1/1920 | Thomas ........................ 464/99 |
| 2,067,285 A | * | 1/1937 | Pearce ......................... 464/95 |
| 3,543,538 A | | 12/1970 | Farrell et al. |
| 4,421,496 A | * | 12/1983 | Emerson et al. |

FOREIGN PATENT DOCUMENTS

| JP | 32-6803 | 7/1957 |
| JP | 51-122233 | 10/1976 |
| JP | 61-45629 | 3/1986 |

* cited by examiner

Primary Examiner—Greg Binda
(74) Attorney, Agent, or Firm—Armstrong, Westerman & Hattori, LLP

(57) ABSTRACT

A leaf spring type coupling is described which is provided with a first leaf spring 9 and a second leaf spring 10 that absorb a deviation in the axial center of a first rotating axis and a second rotating axis via an intermediate member 8 provided between a first shaft connection member 6 and a second shaft connection member 7, wherein a second shaft coupling shaft 7 thereron is inserted and provided between a second leaf spring 10 and the intermediate member 8 so that a protrusion 7B of the second shaft connection member 7 passes through a through-hole 10B of the second leaf spring 10, and the first leaf spring 9 is inserted and provided between the intermediate member 8 and the first shaft connection member 6. Also, the intermediate member 8 and the second shaft connection members 7 are provided between the first leaf spring 9 and the second leaf spring 10, wherein the mounting angles of both of the member 7 and 8 are deviated by 90 degrees relatively to each other about their rotating axis. Thereby, it is possible to shorten the length, in the axial direction, of the coupling necessary to connect, for example, a rotation detector and a motor to each other, and it is possible to provide a small sized leaf spring type coupling.

3 Claims, 5 Drawing Sheets

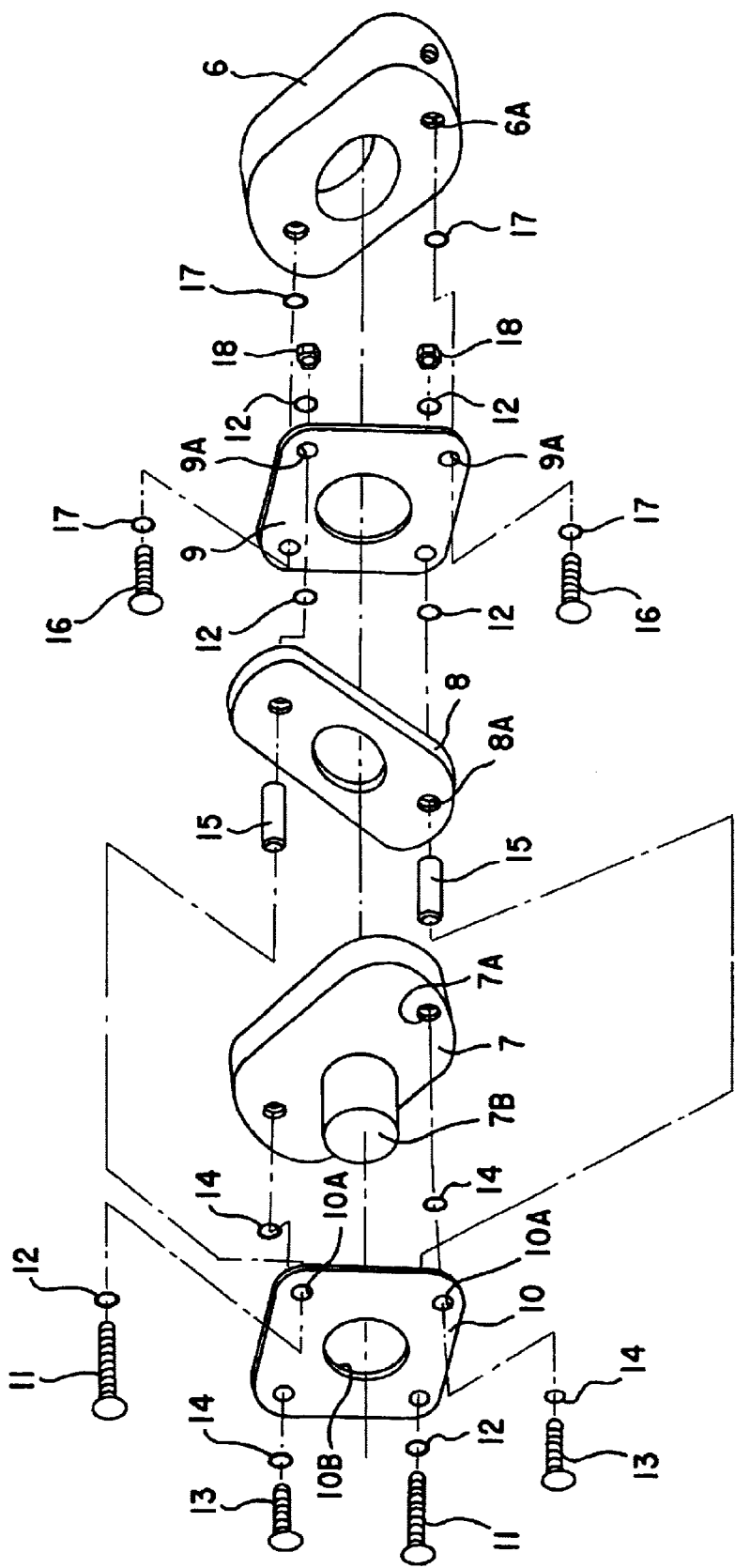

LEAF SPRING TYPE COUPLING AND MOTOR DEVICE USING THE COUPLING

BACKGROUND OF THE INVENTION

1. Field of the Invention

The present invention relates to a leaf spring type coupling and a motor device using the coupling that is capable of shortening the length, in the axial direction, necessary to couple a motor of a coupling with a rotation detector when incorporating the coupling in a motor with a rotation detector.

2. Description of the Related Arts

Conventionally, the structure of a leaf spring type coupling used for a motor with a rotation detector has been as shown in FIG. 4 and FIG. 5.

FIG. 4 is a structural view of a motor with a rotation detector, in which a prior art leaf spring type coupling is incorporated, and FIG. 5 is a perspective view of the assembly of the prior art leaf spring type coupling. Also, components that are the same in the drawings are given the same reference numbers.

In FIG. 4 and FIG. 5, 1 denotes a motor, 2 denotes a motor shaft that protrudes from the non-load side of the motor and acts as the first rotating axis, 3 denotes a rotation detector, 4 denotes a shaft for coupling the motor at the rotation detector side, which protrudes from the rotation detector side and acts as the second rotating axis, 25 denotes a coupling, 26 denotes a flange for mounting the motor shaft that acts as the first shaft connection member, 27 denotes a flange for mounting the rotation detector that acts as the second shaft connection member, 28 denotes an intermediate member, 9 denotes a roughly square-shaped first leaf spring made of a thin flexible member, 10 denotes a roughly square-shaped second leaf spring made of a thin flexible member, and L2 shows the length of a coupling necessary to connect the rotation detector 3 with the motor 1 in its axial direction.

Such a coupling 25 is constructed by connecting the first leaf spring 9 and the second leaf spring 10 to each other by means of bolts 29 and 33 and a nut 35 via the intermediate member 28 between the motor shaft mounting flange 26, in which the motor shaft 2 and the detector side motor coupling shaft 4 are, respectively, mounted, and the detector shaft mounting flange 27.

Next, a description is given of the assembling process of the coupling thus constructed, with reference to a disassembled perspective view of the coupling shown in FIG. 6. Also, hole portions 9A and 10A are each provided at the diagonal line positions of a roughly square-shaped hole pattern in the first leaf spring 9 and the second leaf spring 10, respectively, and bolt holes 26A, 27A and 28A that are provided with female threading are provided at both ends in the lengthwise direction of the motor shaft mounting flange 26, detector shaft mounting flange 27, and intermediate member 28.

First, the bolt 31 is caused to pass through the hole portion 10A so that the bolt hole 27A of the detector shaft mounting flange 27 is aligned with the position of the hole portion 10A on the diagonal line of the second leaf spring 10, and the bolt 31 is screwed in the bolt hole 27A, whereby the second leaf spring 10 is connected to the detector shaft mounting flange 27. Next, the bolt 33 is caused to pass through the hole portion 9A so that the bolt hole 26A of the motor shaft mounting flange 26 is aligned with the position of the hole portion 9A on the diagonal line of the first leaf spring 9, and the bolt 33 is screwed in the bolt hole 26A, whereby the first leaf spring 9 is connected to the motor shaft mounting flange 26. Further, the intermediate member 28 is inserted between the leaf spring 10 and the leaf spring 9. And, the bolt 29 is inserted into the hole portion 10A of the second leaf spring 10, the bolt hole 28A of the intermediate member 28, and the hole portion 9A of the first leaf spring 9, so that the bolt hole 28A of the intermediate member 28 is aligned with the hole portions 9A and 10A on the diagonal line of the first and second leaf springs 9 and 10, and simultaneously, the bolt 29 is coupled with the nut 35 from the rear side of the first leaf spring 9, wherein a coupling is completed. Also, the bolts 29, 31 and 33 are, respectively, provided with washers 30, 32 and 34 on both the front surface and rear surface sides of the respective leaf springs 9 and 10.

Next, a description is given of the actions thereof.

As shown in FIG. 4, the coupling 25 thus constructed is attached to the motor shaft 2 of the rotation detector motor and the shaft 4 for coupling the detector side motor, wherein as the motor 1 is caused to rotate, the coupling 25 absorbs eccentricity at high accuracy and couples the rotation detector and the motor to each other by deformation of the two leaf springs 9 and 10 that are coupled between the motor shaft mounting flange 26 and the detector shaft mounting flange 27 via the intermediate member 28.

The prior art leaf spring type coupling is excellent in view of absorbing the eccentricity of the motor shaft 2 and the detector side motor coupling shaft 4 and improving the angular accuracy. However, since all the members of the motor shaft mounting flange 26, first leaf spring 9, intermediate member 28, second leaf spring 10 and detector shaft mounting flange 27 are disposed in a series, the length L2 of the coupling necessary to connect the motor 1 and the rotation detector 3 in the axial direction is made longer, and this causes a problem in view of downsizing the motor with a rotation detector.

Therefore, it is therefore an object to provide a small-sized leaf spring type coupling and a motor device using the coupling that is capable of shortening the length of the coupling in its axial direction.

SUMMARY OF THE INVENTION

The present invention provides a leaf spring type coupling including a first shaft connection member for coupling the first rotating axis; a second shaft connection member that is coupled with the second rotating axis and is provided with a protrusion; an intermediate member that intervenes between the above-described first shaft connection member and the above-described second shaft connection member; and a first leaf spring and a second leaf spring, which absorb a deviation in the axial misalignment of the above-described rotating axis and the above-described second rotating axis via the above-described intermediate member and have a roughly square-shaped through-hole; wherein the above-described second shaft connection member causes protrusion of the above-described second shaft connection member to pass through a through-hole of the above-described second leaf spring, and simultaneously, intervenes between the above-described second leaf spring and the above-described intermediate member; the above-described first leaf spring is inserted between the above-described intermediate member and the above-described first shaft connection member; the above-described intermediate member and the above-described second shaft connection member are provided between the above-described first leaf spring and the above-described second leaf spring, and the mounting angle of the above-described intermediate member and the above-described second shaft connection member in the lengthwise direction is aligned with the position on the diagonal line of the peripheral parts of the first and second leaf springs and these are deviated by 90 degrees relatively to each other about their rotating axis.

Further, a part of the above-described second shaft connection member is made tapered so that the above-described second shaft connection member is detachable from the above-described second rotating axis.

Further, the present invention provides a motor device including the above-described leaf spring type coupling and a motor with a rotation detector, in which the coupling is incorporated.

BRIEF DESCRIPTION OF THE DRAWINGS

FIG. 1A is an assembled perspective view of a leaf spring type coupling showing an embodiment of the invention;

FIG. 1B is a view similar to FIG. 1A showing a modified form of the invention;

FIG. 2 is a disassembled perspective view of the leaf spring type coupling according to the invention;

DETAILED DESCRIPTION OF THE PREFERRED EMBODIMENTS

Figures 1A, 1B:
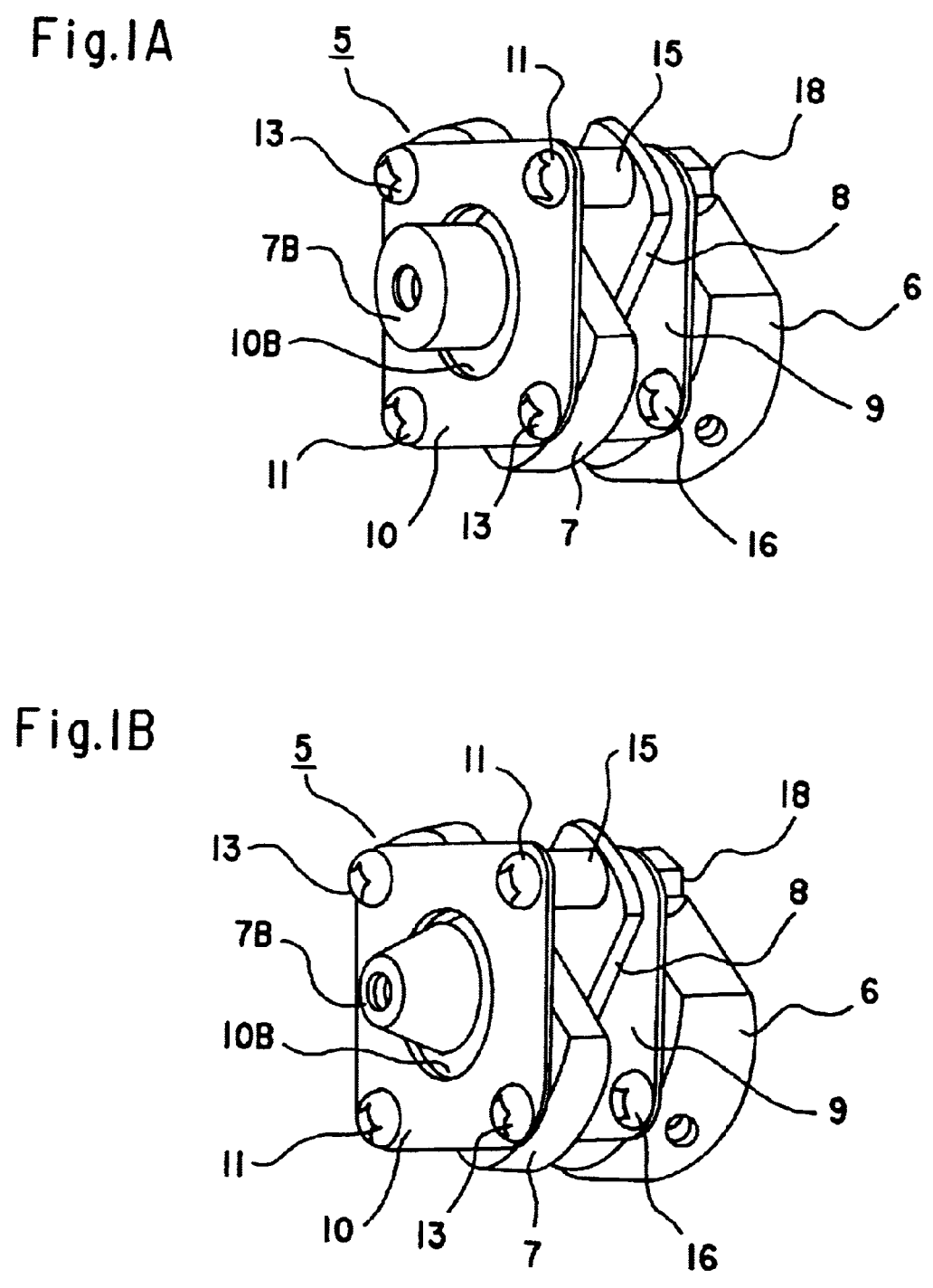
Figure 3:
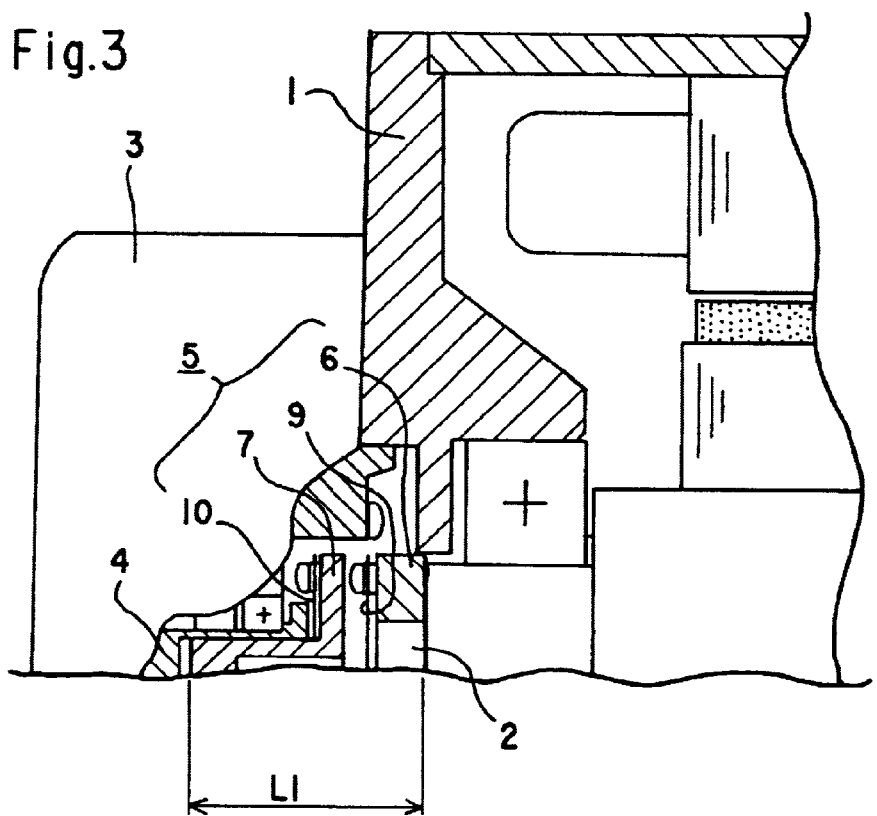
FIG. 3 is a sectional view of a motor with a rotation detector, in which the leaf spring type coupling according to the invention is incorporated.
Figure 4:
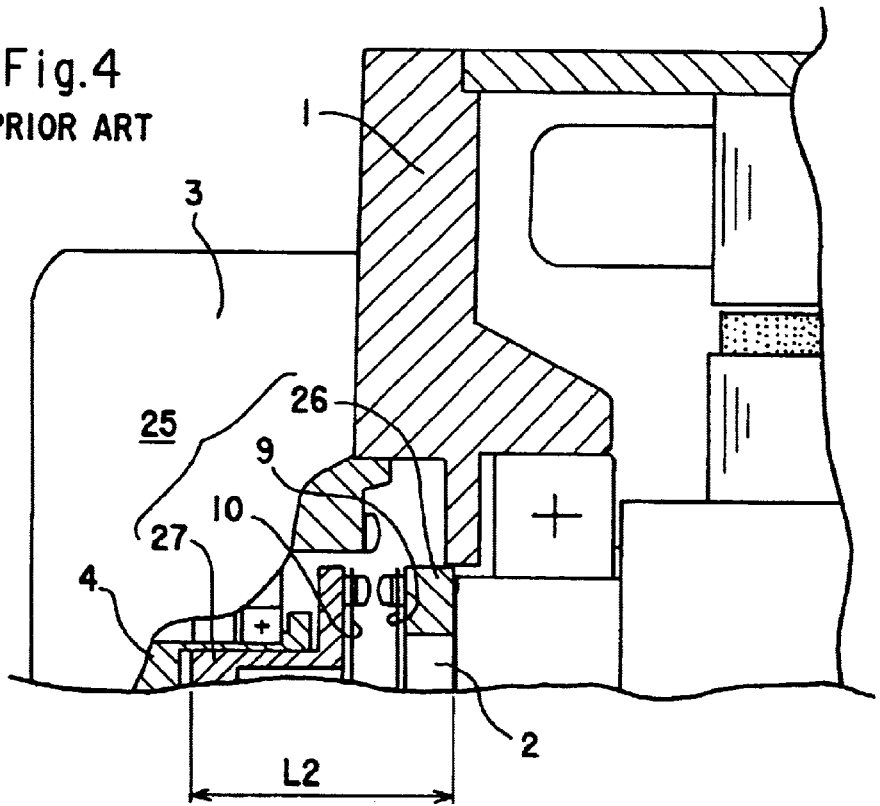
FIG. 4 is a sectional view of a motor with a rotation detector, in which a prior art leaf spring coupling is incorporated.
Figure 5:
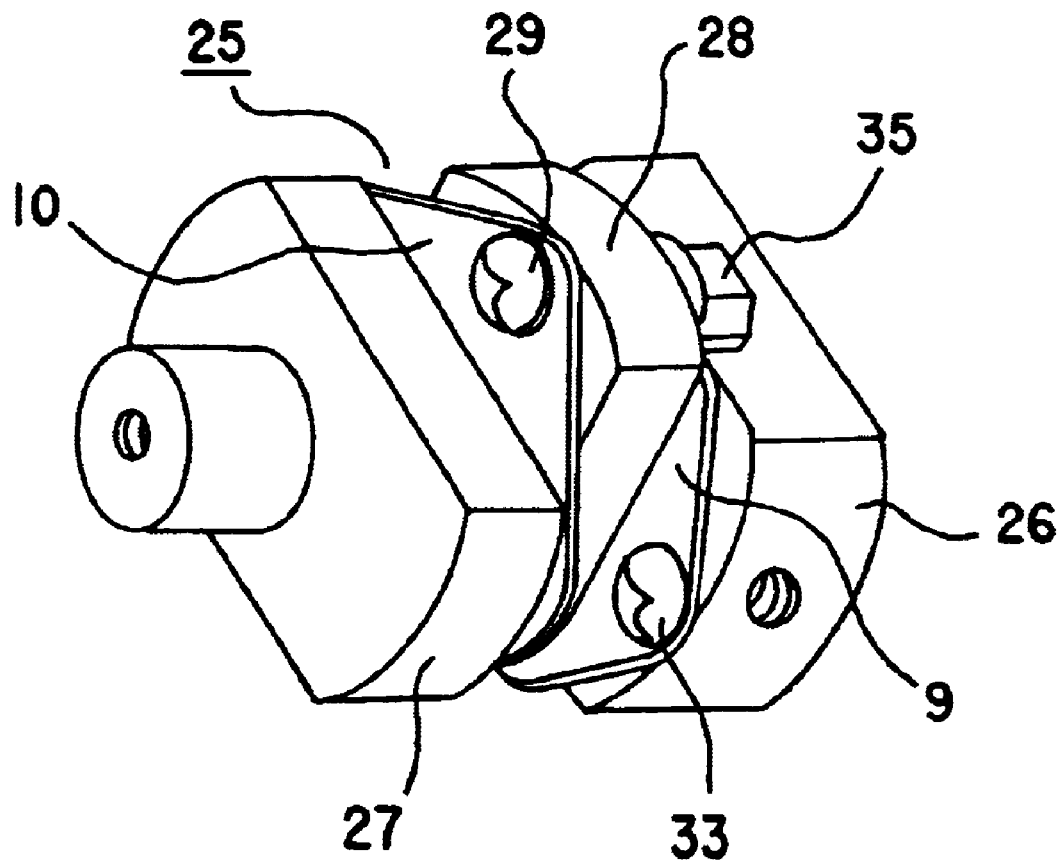
FIG. 5 is an assembled perspective view of the prior art leaf spring type coupling.
Figure 6:
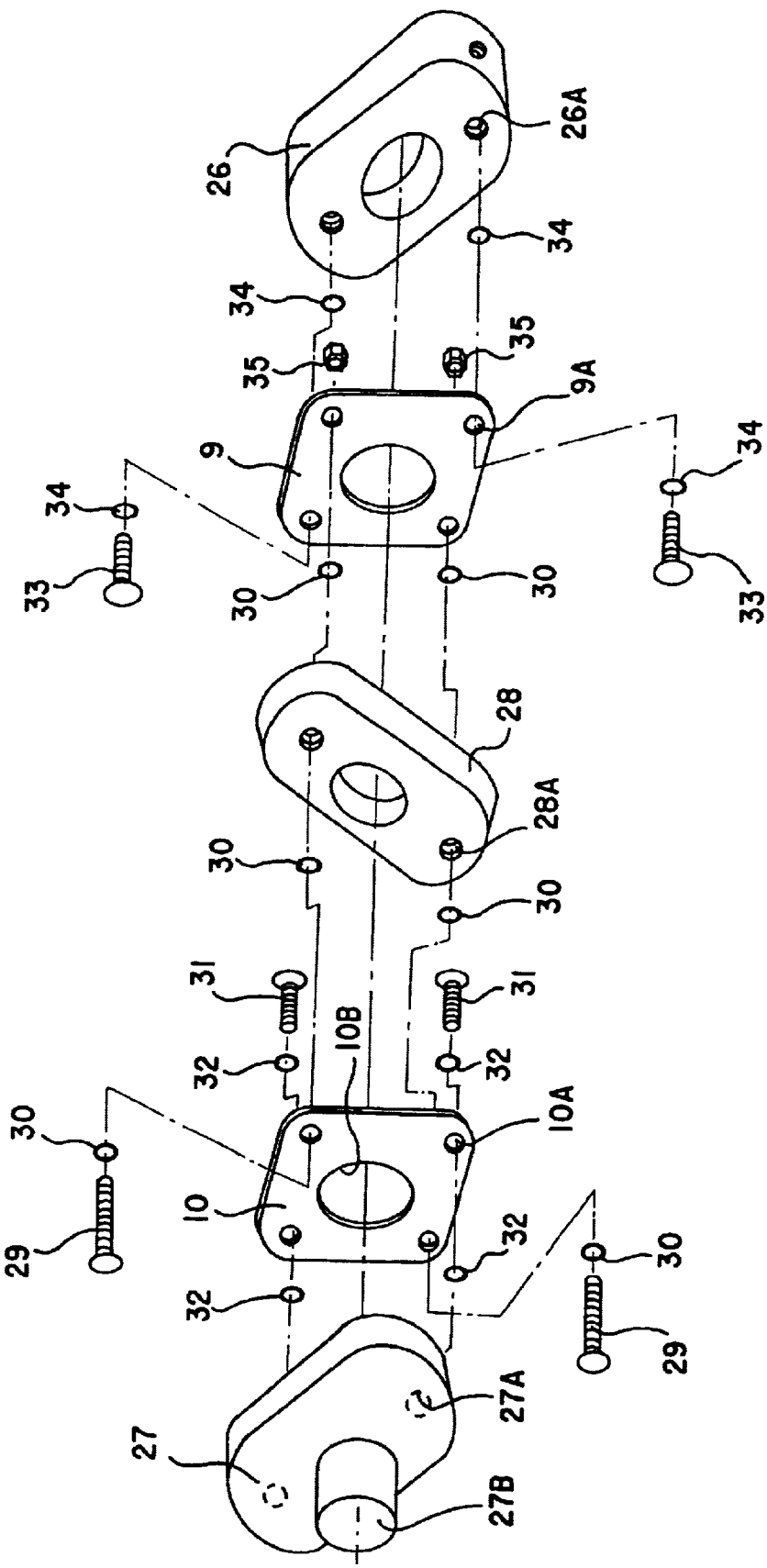
FIG. 6 is a disassembled perspective view showing the prior art leaf spring coupling.

Hereinafter, a description is given of the embodiment of the invention with reference to the accompanying drawings, wherein FIG. 1A is an assembled perspective view of a leaf spring type coupling showing an embodiment of the invention; and FIG. 1B is a modified form of the invention. Components that are the same as those in the prior art leaf spring type coupling are given the same reference numbers, and description thereof is omitted.

The basic construction of the coupling according to the invention, that is, the construction in which a motor shaft mounting flange, an intermediate member and a first leaf spring are disposed in a series, is the same as that of the prior art leaf spring type coupling. However, the present invention differs in the following two points from the prior arts. That is, (1) the protrusion 7B of the detector shaft mounting flange 7, which acts as the second shaft connection member, is inserted into the through-hole 10B of the second leaf spring 10, and simultaneously, the above-described detector shaft mounting flange 7 is inserted and provided between the second leaf spring 10 and the intermediate member 8, wherein the first leaf spring 9 is inserted between the intermediate member 8 and the motor shaft mounting flange 6 that acts as the first shaft connection member.

(2) the intermediate member 8 and the detector shaft mounting flange 7 are provided between the first leaf spring 9 and the second leaf spring 10, the mounting angle of the intermediate member 8 and the detector shaft mounting flange 7 in the lengthwise direction is aligned with the position on the diagonal line of the peripheral portions of the first leaf spring 9 and the second leaf spring 10, and they are deviated by 90 degrees relatively to each other about their rotating axis.

A description is given of the assembling process of a coupling having such a construction.

FIG. 2 is a disassembled perspective view of a leaf spring type coupling according to the invention.

First, the protrusion 7B of the detector shaft mounting flange 7, which may be cylindrical as shown in FIG. 1A or conically tapered as shown in FIG. 1B, is inserted into and passed through the through-hole 10B of the first leaf spring 10 so that the bolt hole 7A of the detector shaft mounting flange 7 is aligned with the hole portion 10A on the diagonal line of the second leaf spring 10, and simultaneously, after a bolt 13 is passed through the holes portion 10A of the second leaf spring 10, and is screwed in the bolt hole 7A of the detector shaft mounting flange 7, whereby both of the members 10 and 7 are connected to each other.

Next, the intermediate member 8 is provided at the opposite side of the protrusion 7B of the detector shaft mounting flange 7, and simultaneously, a collar 15 is inserted between the detector shaft mounting flange 7 and the intermediate member 8.

After that, the bolt 11 is passed through the bolt hole 8A of the intermediate member 8 via the hole portion 10A of the second leaf spring 10 and the collar 15, so that the bolt hole 8A of the intermediate member 8 is aligned with the hole portions 9A and 10A of the first and second leaf springs 9 and 10 on the diagonal line.

The bolt 11 that passes through the bolt hole 8A of the intermediate member 8 is further passed through the hole portion 9A of the first leaf spring 9, wherein the bolt 11 is coupled with the nut 18 from the rear surface side of the first leaf spring 9, and the respective members 8, 9 and 10 are connected to each other. Finally, the motor shaft mounting flange 6 is secured on the rear surface side of the first leaf spring 9, and simultaneously, the bolt 16 is passed through the hole portion 9A of the first leaf spring so that the bolt hole 6A of the motor shaft mounting flange 6 is aligned with the position of the hole portion 9A on the diagonal line of the first leaf spring 9. After that, the bolt 16 is screwed into the bolt hole 6A of the motor shaft mounting flange 6, and both the members 9 and 6 are connected to each other to complete the coupling. Also, the bolts 11, 13 and 16 are, respectively, provided with washers 12, 14 and 17 at the front surface side and rear surface side of the respective leaf springs 9 and 10.

A motor with a rotation detector, which incorporates a coupling thus constructed is as shown in FIG. 3. FIG. 3 shows a structural view of a motor with a rotation detector, in which a leaf spring type coupling according to the invention is incorporated.

L1 is a length of a coupling necessary to connect a rotation detector with a motor in the axial direction. Where the length L1 is compared with the length L2 of the prior art coupling in the axial direction, the length L1 in the axial direction of the coupling according to the invention is only 70% of the length L2 of the prior art coupling, and the coupling is made smaller in size.

A description is given of the actions thereof.

Where such a coupling is attached to the motor shaft 2 of the motor with a rotation detector shown in FIG. 3 and to the detector side motor coupling shaft 4, and the motor is caused to rotate, the coupling 5 inserts the detector shaft mounting flange 7 between the second leaf spring 10 and the intermediate member 8 and absorbs eccentricity at high accuracy by the deformation of the two leaf springs 9 and 10 coupled to each other via the intermediate member 8 and the detector shaft mounting flange 7, wherein the rotation detector is coupled with the motor.

Thus, since the embodiment of the present invention is constructed so that (1) the detector shaft mounting flange is inserted into the through-hole of the second leaf spring, simultaneously, the protrusion of the detector shaft mounting flange is inserted between the second leaf spring and the intermediate member, and the first leaf spring is inserted between the intermediate member and the motor shaft mounting flange, and (2) the intermediate member and the detector shaft mounting flange are provided between the first leaf spring and the second leaf spring, simultaneously, the mounting angles of the intermediate member and the detector shaft mounting flange in the lengthwise direction are aligned with the positions on the diagonal line of the peripheral portions of the first and second leaf springs, and they are deviated by 90 degrees relatively to each other about their rotating axis, it does not become necessary to oppositely dispose bolts to connect the first leaf spring and the second leaf spring, and the respective leaf springs and the flanges between the detector shaft mounting flange and the motor shaft mounting flange, wherein it becomes possible to shorten the length of the intermediate member in the axial direction. As a result, the length necessary to connect the coupling motor and the rotation detector to each other can be shortened.

Also, since a part of the shapes of the detector shaft mounting flange 7, intermediate member 8, and motor shaft mounting flange 6 has a straight portion, it is possible to freely assemble the coupling 5 by means of tools.

Also, the protrusion of the detector shaft mounting flange may be tapered (see FIG. 1B). If the protrusion is tapered, it is possible to securely lock the detector shaft mounting flange at the detector side motor coupling shaft, and it is easy to attach and detach the same.

INDUSTRIAL APPLICABILITY

As described above, a leaf spring type coupling and a motor device using the coupling according to the invention is very effective to couple a motor shaft of a rotation detector attached motor, which is mounted in, for example, machine tools, robots, etc., and a detector side motor coupling shaft to each other.

What is claimed is:

1. A leaf spring coupling including:

a first shaft connection member for coupling a member having a first rotating axis;

a second shaft connection member that is coupled with a member having a second rotating axis and is provided with a protrusion;

an intermediate member that is provided between said first shaft connection member and said second shaft connection member; and a first leaf spring and a second leaf spring, which absorb a deviation in axial misalignment of said first rotating member and said second rotating member via said intermediate member and have through holes disposed in a roughly square-shaped pattern;

wherein said second shaft connection member is disposed with the protrusion thereof passing through a through-hole of said second leaf spring, to be disposed between said second leaf spring and said intermediate member;

said first leaf spring being disposed between said intermediate member and said first shaft connection member;

said intermediate member and said second shaft connection member being disposed between said first leaf spring and said second leaf spring, and the mounting angle of said intermediate member and said second shaft connection member in the lengthwise direction being aligned with a position defined by a diagonal line of the pattern of through holes of the first and second leaf springs and the same are angularly deviated by 90 degrees relatively to each other about the rotating axes.

2. The leaf spring coupling as set forth in claim 1, wherein said second shaft connection member is constructed so that a part of said second shaft connection member is tapered so as to be freely attached to, and detached from, said member having said second rotating axis.

3. A motor device including the leaf spring coupling as set forth in claim 1 or 2 coupling a motor with a rotation detector.

* * * * *